UNITED STATES PATENT OFFICE 2,672,475

PROCESS FOR PREPARING ALKYL TRICHLOROSILANES

William H. Daudt, Midland, Mich., assignor to Dow Corning Corporation, Midland, Mich., a corporation of Michigan No Drawing. Application December 1, 1952, Serial No. 323,516

6 Claims. (Cl. 260—448.2)

This invention relates to a process for preparing methyltrichlorosilane.

Previous methods for preparing alkyl trichlorosilanes have entailed contacting silicon with alkyl halides or alkyl ethers. It has now been discovered that the process may be carried out employing the less expensive alkanes. Ample and inexpensive sources of alkanes exist commercially in the form of petroleum products or natural gas.

The process of this invention comprises contacting silicon, heated from 300° C. to 1,000° C., with a mixture of alkane and hydrogen chloride. In the mixture there is at least 1 mol of alkane per mol of HCl.

The by-products of the process of this invention, notably $HSiCl_3$ and $SiCl_4$, are readily separated and are highly useful in other reactions. The unreacted alkane and HCl can be readily recovered to effect a saving in cost, if desired.

The process of this invention is adaptable for use in either batch-wise or continuous reaction systems. No catalyst is necessary, although catalysts such as $AlCl_3$ may be used, if it is desired, to alter the rate of the reaction. Preferably the silicon is in a finely divided state.

The process of this invention occurs upon contact of the alkane and HCl with the heated silicon and takes place at any pressure. However, if pressure is employed, it is preferably autogenous. Temperatures below 300° C. and above 1,000° C. cannot be successfully employed. Temperatures of 600 to 900° C. are preferred particularly if the process is conducted at atmospheric pressure.

The preferred alkane is methane, since it is of low cost and readily available as a predominant constituent of natural gases. Other alkanes (or cycloalkanes) which may be employed are, for example, propane, butane, ethane, heptane, and cyclohexane. Alkanes having more than 1 carbon atom apparently crack during the process to give methyltrichlorosilane and ethyl trichlorosilane in substantial yields. Either single or mixed alkanes may, of course, be advantageously employed.

The relative proportions of alkane and HCl employed herein are such that there is at least one mol of alkane per mol of HCl. There is no critical lower limit of relative amount of HCl. Excellent results have been obtained employing 1 to 5 mols alkane per mol of HCl.

The following examples illustrate this invention without any implied limitations. The true scope of this invention is properly delineated in the appended claims.

EXAMPLE 1

Methyltrichlorosilane was prepared by the following procedure:

A 3-foot fixed bed of a commercial (97 per cent) silicon powder (screened between 28 and 48 mesh) supported by porcelain saddles was placed in an electrically heated vertical quartz 4-foot tube (having an internal diameter of one inch). The bed was heated up to temperature. City gas, consisting of 75.5 per cent (by volume) $CH_4$, 13.3 per cent $C_2H_6$, 10.9 per cent $N_2$, 0.2 per cent $O_2$, and 0.1 per cent $CO_2$, and HCl were metered in separately at the bottom of the tube. The chlorosilanes produced were condensed out of the effluent gases by dry ice traps. The composition of the condensate was determined by infra-red analysis.

Two runs were made with results as shown in the following table. In run No. 1, the gas and HCl were passed through the bed heated to 746–809° C. for 1¾ hours, the gases being metered in at a rate averaging .63 liter city gas per minute and .15 liter HCl per minute. Run No. 2 was conducted for 1½ hours at 825–865° C. with metering rates of .14 liter HCl per minute and .25 liter of city gas per minute. The composition of the condensate is expressed in the table in per cent by weight.

Table

| Run | Yield of Condensate in grams | Products expressed as percent of condensate | | |
|---|---|---|---|---|
| | | $HSiCl_3$ | $SiCl_4$ | $MeSiCl_3$ |
| 1 | 29.0 | 16.2 | 68.5 | 15.2 |
| 2 | 28.8 | 11.0 | 50.5 | 20.3 |

The above table shows an economically useful yield of $MeSiCl_3$, readily separable by distillation. The uncondensed effluent (city gas and HCl) may be separated and recycled if desired. The by-products in the condensed material, $HSiCl_3$ and $SiCl_4$, are highly valuable materials for use in other reactions in the organosilicon field.

EXAMPLE 2

A 2.4 liter bomb was charged with 56 g. (2.0 mols) of commercial silicon (screened between 12 and 30 mesh), then with HCl to 355 p. s. i. (2.4 mols) followed by methane to 750 p. s. i. (2.6 mols). The bomb, under constant rotation, was heated to 450° C. for 16 hours. After cooling, unreacted gases were bled off and there was obtained 68.6 grams of product which consisted of (as determined by infro-red analysis) 10.2 per cent (by weight) MeSiCl$_3$, 17.9 per cent HSiCl$_3$, 48.8 per cent SiCl$_4$, and 23.1 per cent undetermined material.

That which is claimed is:

1. A process for preparing methyl trichlorosilane comprising contacting silicon with mixtures of an alkane and HCl, there being at least 1 mol of alkane per mol of HCl, said contacting being effected at a temperature of 300° C. to 1,000° C.

2. The process of claim 1 wherein the alkane has less than 8 carbon atoms.

3. The process of claim 1 wherein the alkane is methane.

4. A process for preparing methyl trichlorosilane comprising contacting silicon with mixtures of an alkane and HCl, there being at least 1 mol of alkane per mole of HCl, said contacting being effected at a temperature of 600° C. to 900° C.

5. The process of claim 4 wherein the alkane has less than 8 carbon atoms.

6. The process of claim 4 wherein the alkane is methane.

WILLIAM H. DAUDT.

References Cited in the file of this patent

UNITED STATES PATENTS

| Number | Name | Date |
| --- | --- | --- |
| 2,459,539 | Rochow | Jan. 18, 1949 |
| 2,483,373 | Rochow | Sept. 27, 1949 |
| 2,488,487 | Barry | Nov. 15, 1949 |
| 2,595,767 | Coe | May 6, 1952 |

FOREIGN PATENTS

| Number | Country | Date |
| --- | --- | --- |
| 609,507 | Great Britain | Oct. 1, 1948 |